(12) United States Patent
Holmstrom et al.

(10) Patent No.: US 9,371,093 B1
(45) Date of Patent: Jun. 21, 2016

(54) VEHICLES HAVING UPPER SIDE MEMBER REINFORCEMENT PORTIONS

(71) Applicant: Toyota Motor Engineering & Manufacturing North America, Inc., Erlanger, KY (US)

(72) Inventors: Adam D. Holmstrom, Pinckney, MI (US); Carlos M. Briceno, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/559,065

(22) Filed: Dec. 3, 2014

(51) Int. Cl.
  *B62D 27/02* (2006.01)
  *B62D 25/04* (2006.01)
  *B62D 25/08* (2006.01)

(52) U.S. Cl.
  CPC .............. *B62D 27/023* (2013.01); *B62D 25/04* (2013.01); *B62D 25/082* (2013.01)

(58) Field of Classification Search
  CPC .... B62D 27/023; B62D 25/04; B62D 25/082; B62D 25/085
  USPC ............... 296/187.12, 187.09, 187.1, 193.05, 296/193.06, 193.09, 203.02, 30
  See application file for complete search history.

(56) References Cited

U.S. PATENT DOCUMENTS

| | | | | |
|---|---|---|---|---|
| 4,883,309 A * | 11/1989 | Miyazaki | ............. | B62D 27/026 296/192 |
| 4,955,662 A | 9/1990 | Kudo | | |
| 6,332,642 B1 * | 12/2001 | Hanyu | ................. | B62D 25/082 296/198 |
| 7,140,674 B2 * | 11/2006 | Miyoshi | ............... | B62D 25/082 296/193.05 |
| 2002/0063444 A1 * | 5/2002 | Kim | ..................... | B62D 25/081 296/203.02 |
| 2006/0108834 A1 * | 5/2006 | Boulay | .................. | B62D 21/12 296/193.04 |
| 2012/0200120 A1 | 8/2012 | Yamagishi | | |

FOREIGN PATENT DOCUMENTS

| | | |
|---|---|---|
| GB | 1547898 | 6/1979 |
| JP | 2001088743 A | 4/2001 |
| WO | WO2011113550 | 9/2011 |
| WO | WO2013145457 | 10/2013 |

* cited by examiner

*Primary Examiner* — Jason S Morrow
(74) *Attorney, Agent, or Firm* — Dinsmore & Shohl LLP

(57) ABSTRACT

Vehicle structures for dissipating energy associated with an impact are described herein. In one embodiment, a vehicle includes an A-pillar support having a first engagement surface that is oriented forward in a vehicle longitudinal direction. The first engagement surface extends across at least a portion of the A-pillar support in a vehicle lateral direction. The vehicle also includes an upper side member assembly that is coupled to and extends forward from the A-pillar support. The upper side member assembly includes an upper side member outer portion and an upper side member inner portion that is coupled to the upper side member outer portion and is positioned inboard of the upper side member outer portion in the vehicle lateral direction. The upper side member assembly also includes a second engagement surface that is oriented to face rearward and to face the first engagement surface of the A-pillar support.

18 Claims, 7 Drawing Sheets

VEHICLES HAVING UPPER SIDE MEMBER REINFORCEMENT PORTIONS

TECHNICAL FIELD

The present specification generally relates to vehicles including structures for transferring and absorbing energy in the event of an impact and, more specifically, to vehicles that include an upper side member reinforcement portion.

BACKGROUND

Vehicles may be equipped with bumper systems and crash protection structures that plastically deform to absorb energy in the event of an impact. When an object impacts a vehicle at a position that is offset from the centerline of the vehicle such that the object overlaps a portion of the bumper, the ability of all of the energy absorbing structures of the vehicle to absorb energy associated with the impact may be reduced. In some impact configurations, the energy absorbing structures of the vehicle may not be activated or may be only partially activated because the object does not come into contact or only partially comes into contact with associated bumper or vehicle structures. Therefore, the bumper and the energy absorbing structures of the vehicle may have a reduced effect on the dissipation of the energy of the impact. Instead, the energy from the impact may be directed into various vehicle structures.

In one example, a substantial portion of energy from an impact with a small front bumper overlap may be directed into an upper side member that is positioned forward of the vehicle A-pillar. As energy is directed into the upper side member, the upper side member may rotate inboard, deflecting away from the location of the impact. When the upper side member deflects away from the location of the impact, the upper side member may absorb less energy of the impact than when the upper side member does not deflect away from the location of the impact.

Accordingly, a need exists for alternative structures for transferring energy and absorbing energy from a small front bumper overlap impact.

SUMMARY

In one embodiment, a vehicle includes an A-pillar support having a first engagement surface that is oriented forward in a vehicle longitudinal direction. The first engagement surface extends across at least a portion of the A-pillar support in a vehicle lateral direction that is transverse to the vehicle longitudinal direction. The vehicle also includes an upper side member assembly that is coupled to and extends forward from the A-pillar support. The upper side member assembly includes an upper side member outer portion and an upper side member inner portion that is coupled to the upper side member outer portion and is positioned inboard of the upper side member outer portion in the vehicle lateral direction. The upper side member assembly also includes a second engagement surface that is oriented to face rearward in the vehicle longitudinal direction and to face the first engagement surface of the A-pillar support.

In another embodiment, a vehicle includes an A-pillar support that extends upward in a vehicle vertical direction and an upper side member assembly that is coupled to and extends forward from the A-pillar support in a vehicle longitudinal direction. The A-pillar support includes a first engagement surface that is oriented forward in a vehicle longitudinal direction, where the first engagement surface extends across at least a portion of the A-pillar support in a vehicle lateral direction that is transverse to the vehicle longitudinal direction. The A-pillar support also includes an inboard end, an outboard end that is positioned outboard of the inboard end in the vehicle lateral direction, and an A-pillar support centerline that bisects the A-pillar support between the inboard end and the outboard end. The upper side member assembly includes an upper side member outer portion and an upper side member inner portion that is coupled to and positioned inboard of the upper side member outer portion in the vehicle lateral direction. The upper side member assembly also includes a second engagement surface that is oriented to face rearward in the vehicle longitudinal direction and to face the first engagement surface of the A-pillar support, where the second engagement surface extends at least between the outboard end and the A-pillar support centerline in the vehicle lateral direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
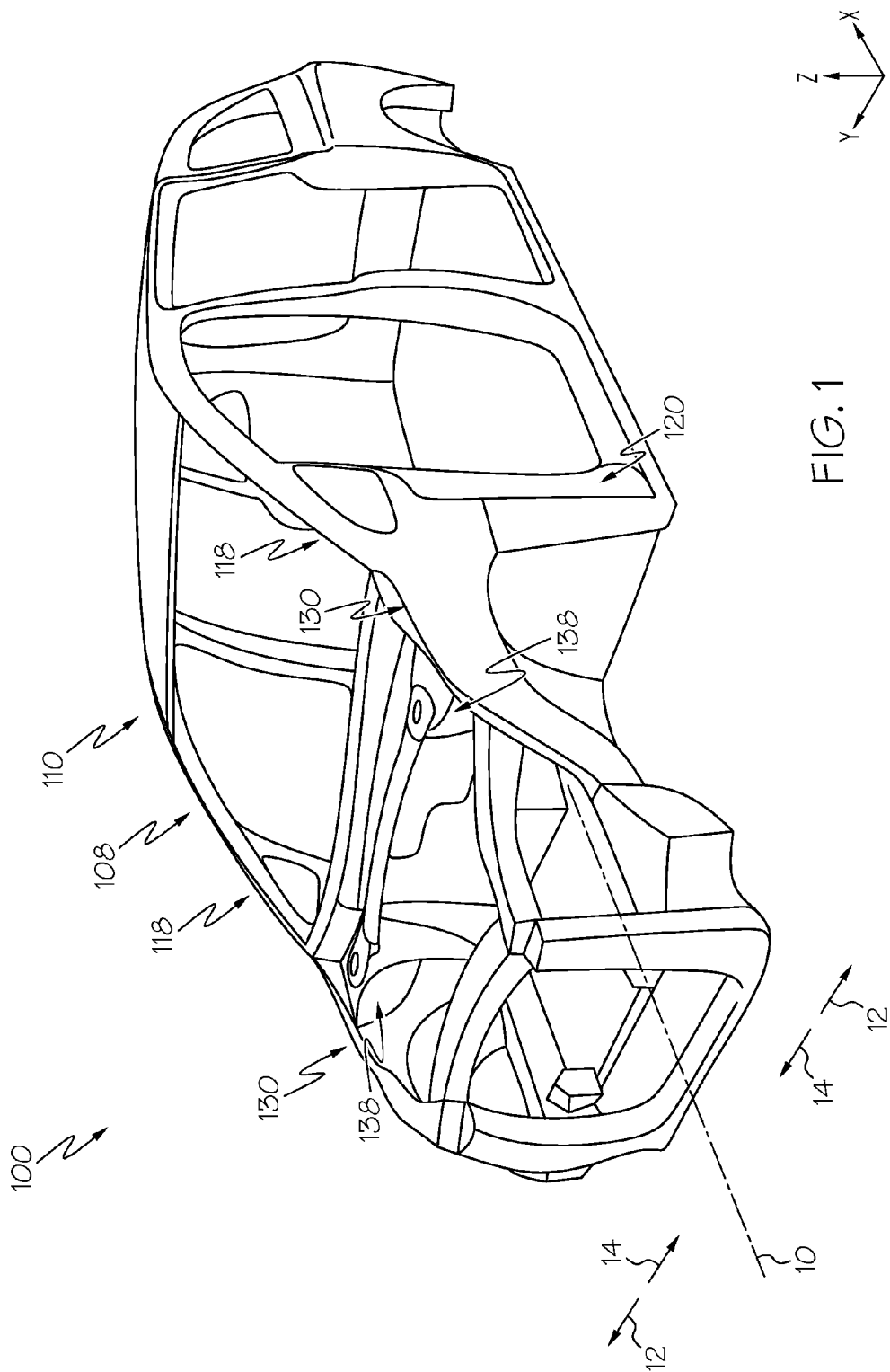
FIG. 1 schematically depicts a perspective view of a unibody of a vehicle including an upper side member assembly according to one or more embodiments shown or described herein.

Vehicle structures for directing and dissipating energy in the event of a small front bumper overlap impact, in which only a portion of the energy dissipation structures of the vehicle are activated, are disclosed herein. A vehicle according to the present disclosure includes an A-pillar support that extends upward in a vehicle vertical direction. The A-pillar support includes a first engagement surface that is oriented forward in a vehicle longitudinal direction and that extends across the A-pillar support in a vehicle lateral direction that is transverse to the vehicle longitudinal direction. The vehicle further includes an upper side member assembly that extends forward of the A-pillar support in the vehicle longitudinal direction. The upper side member assembly includes an upper side member outer portion and an upper side member inner portion. The upper side member assembly further includes an upper side member reinforcement portion positioned between the upper side member outer portion and the upper side member inner portion. The upper side member reinforcement portion includes a second engagement surface that is oriented rearward in the vehicle longitudinal direction to face the first engagement surface of the A-pillar support. In some embodiments, the second engagement surface extends between an outboard end of the A-pillar support and an A-pillar support centerline in the vehicle lateral direction. In some embodiments, the upper side member assembly further includes a bulkhead portion that is positioned between the upper side member reinforcement portion and the upper side member outer portion. Various embodiments of vehicles including upper side member assemblies are described in detail below.

As used herein, the term "vehicle longitudinal direction" refers to the forward-rearward direction of the vehicle (i.e., in the +/−vehicle X-direction as depicted). The term "vehicle lateral direction" refers to the cross-vehicle direction of the vehicle (i.e., in the +/−vehicle Y-direction as depicted), and is transverse to the vehicle longitudinal direction. The term "vehicle vertical direction" refers to the upward-downward direction of the vehicle (i.e., in the +/−vehicle Z-direction as depicted). Further, the terms "inboard" and "outboard" are used to describe the relative positioning of various components of the vehicle. The term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structure of the vehicle 100 may be generally symmetrical about the vehicle centerline 10, the use of terms "inboard" and "outboard" may be switched when evaluating components positioned along opposite sides of the vehicle 100. Further, while certain components of the vehicle 100 are described as extending in one of the identified directions or oriented toward one of the identified directions, it should be understood that these components extend or are oriented in at least these recited directions.

Motor vehicles that incorporate elements according to the present disclosure may include a variety of construction methodologies that are conventionally known, including the unibody construction methodology depicted in FIGS. 1-4C as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring to FIG. 1, a vehicle 100 is depicted with certain body panels removed for clarity. The vehicle 100 includes a unibody 110 onto which a vehicle drivetrain is coupled. The unibody 110 includes a pair of front suspension mounts 138 and a pair of rear suspension mounts (not shown) to which front suspension units (not shown) and rear suspension units (not shown) of the vehicle 100 are generally attached. The vehicle 100 also includes a cabin 108 that is integral with the unibody 110. The cabin 108 generally defines a passenger cabin of the vehicle 100 in which occupants are positioned when the vehicle 100 is under operation.

Referring to FIG. 1, the unibody 110 includes a pair of upper side member assemblies 130 that extend in the vehicle longitudinal direction. The upper side member assemblies 130 are spaced apart from one another in the vehicle in the vehicle lateral direction. An A-pillar support 120 extends rearward in the vehicle longitudinal direction and upward in the vehicle vertical direction from the upper side member assemblies 130. The A-pillar support 120 may extend upward to support a roof (not shown) of the vehicle 100, as conventionally known.

Figure 2:
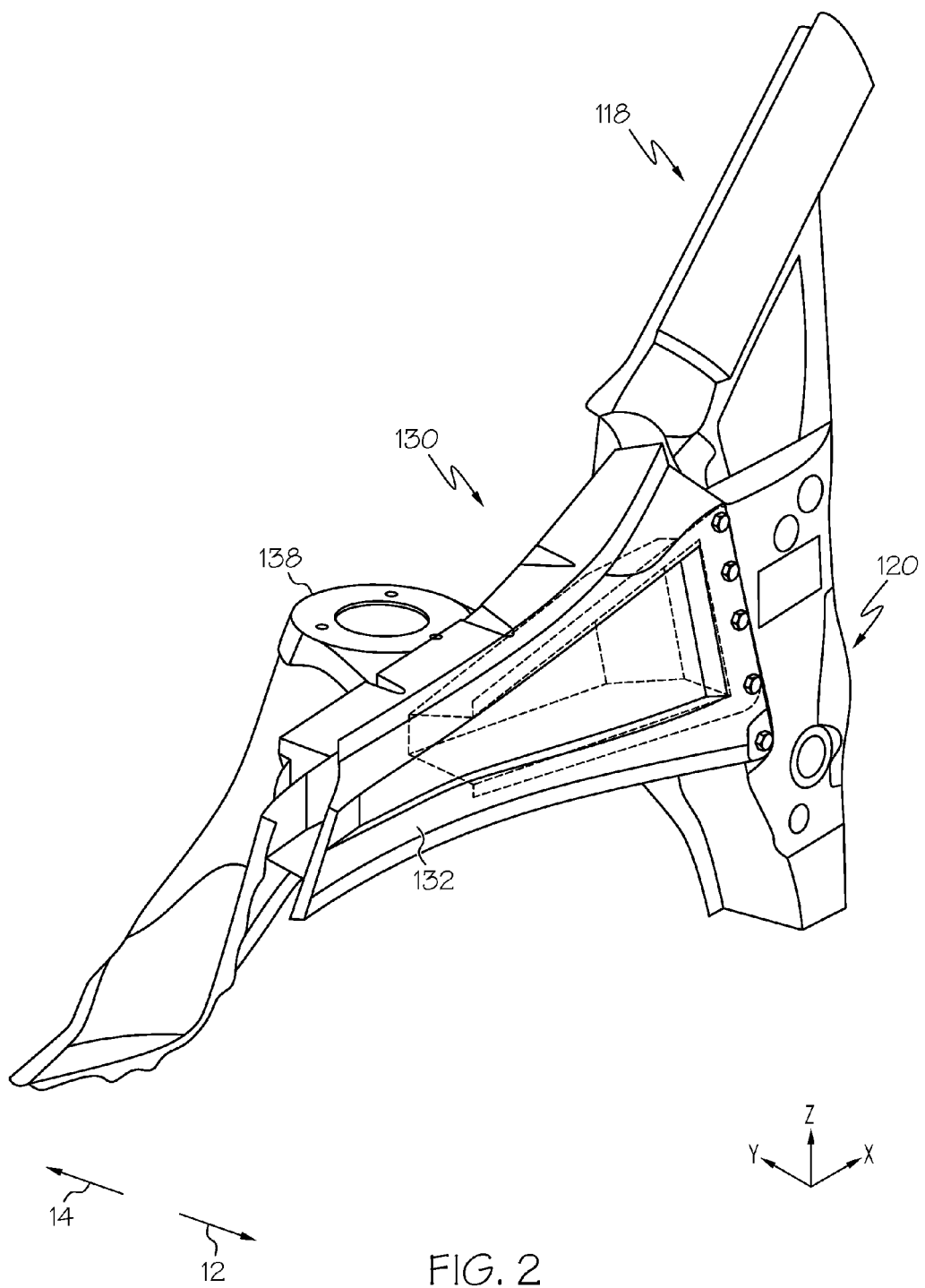
FIG. 2 schematically depicts a perspective view of an A-pillar support and an upper side member assembly according to one or more embodiments shown or described herein.

Referring to FIG. 2, a portion of the unibody 110 of the vehicle is depicted. In the depicted embodiment, the unibody 110 includes the A-pillar 118 that extends upward, rearward, and inboard from the A-pillar support 120. The portion of the unibody 110 also includes an upper side member assembly 130 that is coupled to the A-pillar support 120 and extends forward from the A-pillar support 120. The upper side member assembly 130 may be coupled to a front suspension mount 138 that is positioned inboard from the upper side member assembly 130. Components of the unibody 110 that are positioned proximate to the A-pillar support 120 and the upper side member assembly 130 are depicted in an exploded view in FIG. 3.

Figure 3:
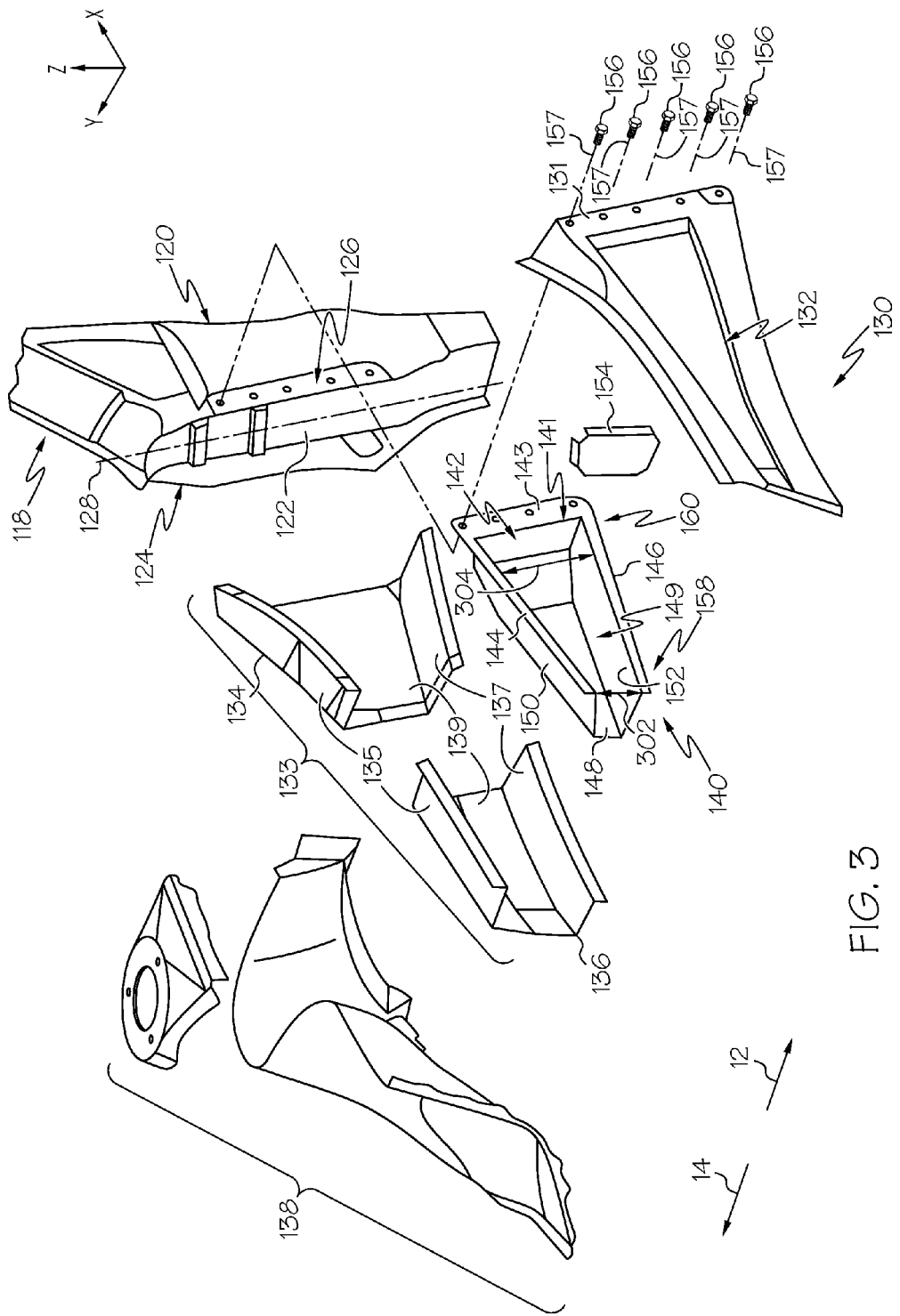
FIG. 3 schematically depicts a perspective view of an A-pillar support and an exploded view of an upper side member assembly according to one or more embodiments shown or described herein.

Referring to FIG. 3, the A-pillar support 120 includes an inboard end 124 and an outboard end 126 that is positioned outboard of the inboard end 124 in the vehicle lateral direction. An A-pillar support centerline 128 bisects the A-pillar support 120 between the inboard end 124 and the outboard end 126 in the vehicle lateral direction.

The A-pillar support 120 includes a first engagement surface 122 that extends across the A-pillar support 120 in the vehicle lateral direction. The first engagement surface 122 is oriented to face generally forward in the vehicle longitudinal direction. In some embodiments, the first engagement surface 122 is oriented to be normal to the vehicle longitudinal direction. In other embodiments, the first engagement surface 122 is oriented to be transverse to the vehicle longitudinal direction. In some embodiments, the first engagement surface 122 may have a generally planar configuration in regions proximate to the attachment of the upper side member assembly 130. In other embodiments, the first engagement surface may have a contoured surface in regions proximate to the attachment of the upper side member assembly 130.

Figure 4A:
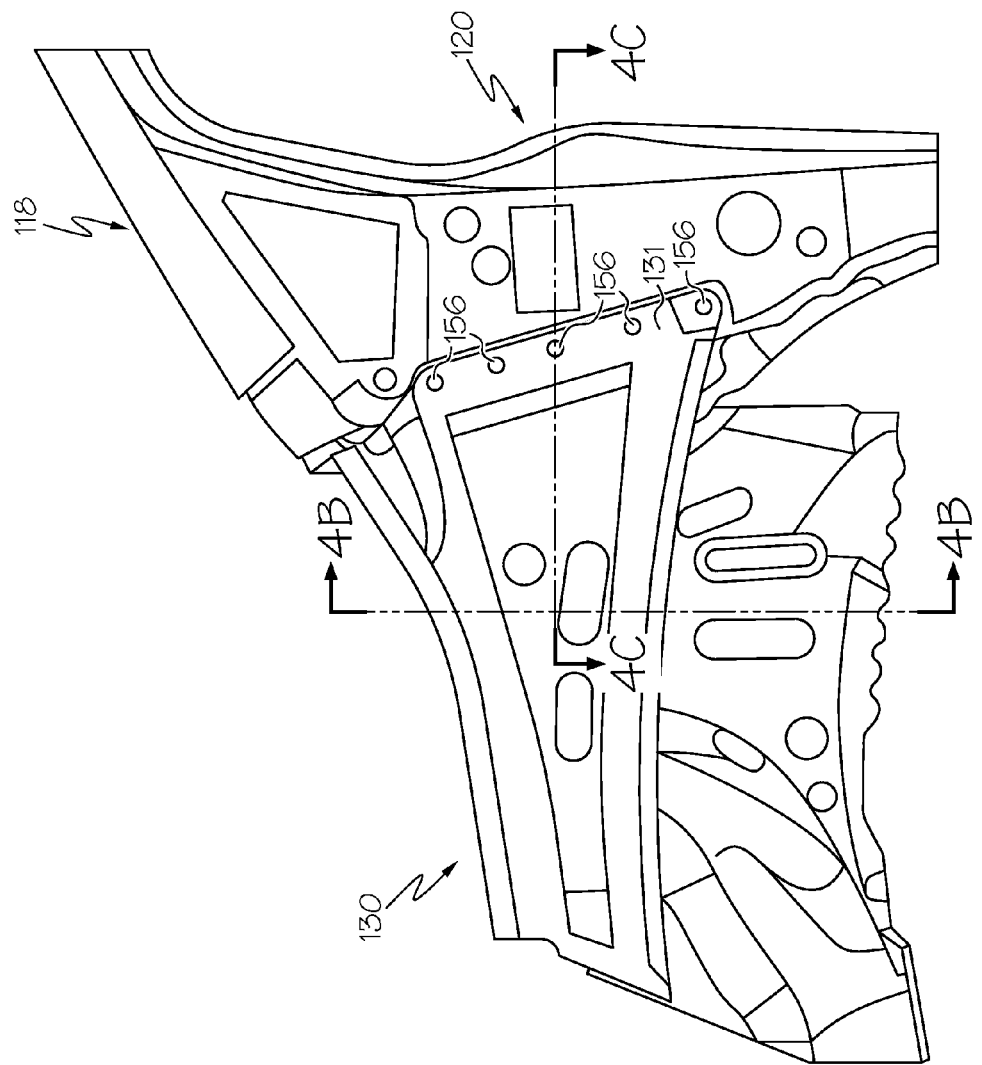
FIG. 4A schematically depicts a side view of a an A-pillar support and an upper side member assembly according to one or more embodiments shown or described herein.

The first engagement surface 122 of the A-pillar support 120 may be positioned to extend along at least a portion of the A-pillar support 120 in the vehicle lateral direction. In some embodiments, the first engagement surface 122 of the A-pillar support 120 may be oriented to an outboard angle relative to the vehicle longitudinal direction. Referring to FIG. 4C, the first engagement surface 122 may extend between the inboard end 124 and the outboard end 126 of the A-pillar support 120 in the vehicle lateral direction. The front end of the inboard end 124 may be positioned forward of the front end of the outboard end 126 in the vehicle longitudinal direction. The first engagement surface 122 may therefore be oriented at an outboard angle with respect to the vehicle longitudinal direction, as depicted in FIG. 4C. Alternatively, in some embodiments, the front end of the inboard end 124 of the first engagement surface 122 may be positioned rearward of the front end of the outboard end 126 of the first engagement surface 122 in the vehicle longitudinal direction, such that the first engagement surface 122 is oriented at an inboard angle with respect to the vehicle lateral direction. In yet other embodiments, the first engagement surface 122 may be approximately normal with the vehicle longitudinal direction. By selectively orienting the first engagement surface 122 with respect to the vehicle longitudinal direction, the direction of force input to the A-pillar support 120 from the upper side member assembly 130 may be targeted. Controlling the direction of force input to the A-pillar support 120 may limit any inboard and/or outboard deflection of the upper side member assembly 130 during an impact, as will be described in greater detail herein.

Referring again to FIG. 3, the vehicle 100 includes an upper side member assembly 130 that is coupled to and extends forward from the A-pillar support 120 in the vehicle longitudinal direction. For clarity, one of the upper side member assemblies 130 is depicted and described. However, it should be understood that the description made herein may apply to both of the upper side member assemblies that are positioned on opposite sides of the vehicle.

The upper side member assembly 130 includes an upper side member outer portion 132, an upper side member inner portion 133, and an upper side member reinforcement portion 140.

In the depicted embodiments, the upper side member inner portion 133 is positioned inboard of the upper side member outer portion 132 in the vehicle lateral direction. The upper side member inner portion 133 may include a rearward upper side member inner portion 134 and a forward upper side member inner portion 136 that is positioned forward of the rearward upper side member inner portion 134 in the vehicle longitudinal direction. The rearward upper side member inner portion 134 and the forward upper side member inner portion 136 may be coupled to one another. In one embodiment, the rearward upper side member inner portion 134 and forward upper side member inner portion 136 may be coupled to one another in a weldment of the upper side member inner portion 133. In other embodiments, the rearward upper side member inner portion and the forward upper side member inner portion may be integral with one another to form a continuous upper side member inner portion.

The upper side member inner portion 133 may include an upper wall 135 and a lower wall 137 positioned below the upper wall 135 in the vehicle vertical direction. The upper side member inner portion 133 may also include an inboard wall 139 that extends between the upper wall 135 and the lower wall 137 in the vehicle vertical direction. The inboard wall 139 may also be positioned inboard of the upper wall 135 and the lower wall 137 such that the upper side member inner portion 133 forms a hat-shaped cross-section.

In the depicted embodiments, a front suspension mount 138 may be coupled to the upper side member inner portion 133. The front suspension mount 138 may be positioned inboard of the upper side member inner portion 133 in the vehicle lateral direction. A front suspension unit (not shown) may be coupled to the front suspension mount 138, as is conventionally known.

The upper side member outer portion 132 of the upper side member assembly 130 is positioned outboard of the upper side member inner portion 133. The upper side member outer portion 132 may be coupled to the upper side member inner portion 133. The upper side member outer portion 132 and the upper side member inner portion 133 may be coupled to one another by a variety of attachments methods including, for example and without limitation, a welded attachment, a brazed attachment, mechanical fasteners, structural adhesives, or combinations thereof.

In the depicted embodiments, the upper side member outer portion 132 is coupled to the A-pillar support 120. The upper side member outer portion 132 may include an A-pillar support attachment flange 131 that may be coupled to the outboard end 126 of the A-pillar support 120. Through the joining of the A-pillar support attachment flange 131 to the outboard end 126 of the A-pillar support 120, the upper side member assembly 130 is coupled to the A-pillar support 120, as depicted in FIG. 4A. The upper side member outer portion 132 may be coupled to the A-pillar support 120 by one or more mechanical fasteners 156. The one or more mechanical fasteners 156 may include a variety of mechanical fasteners, for example and without limitation, bolts, nut and bolt assemblies, sheet metal screws, and rivets, or the like. Each of the plurality of mechanical fasteners 156 may include a centerline axis 157 that extends through the centerline of the mechanical fasteners 156. The centerline axis 157 of each of the mechanical fasteners 156 may be positioned to be transverse to the A-pillar support attachment flange 131. Alternatively or in addition to the mechanical fasteners 156, the upper side member outer portion 132 may be coupled to the A-pillar support 120 by a variety of attachments methods including, for example and without limitation, a welded attachment, a brazed attachment, and/or structural adhesives.

Figure 4B:
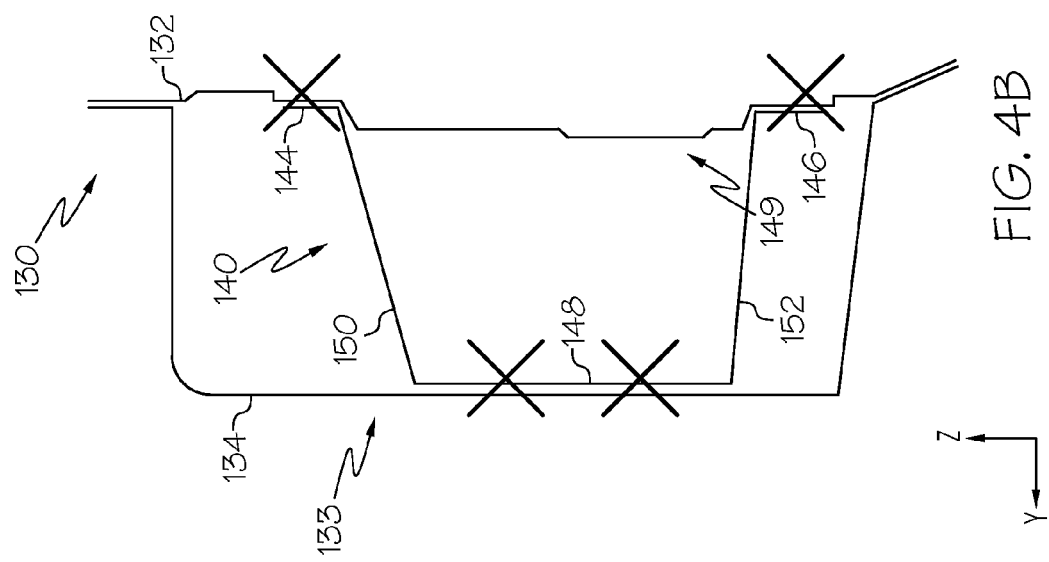
FIG. 4B schematically depicts a section view of an upper side member assembly along 4B-4B depicted in FIG. 4A according to one or more embodiments shown or described herein.
Figure 4C:
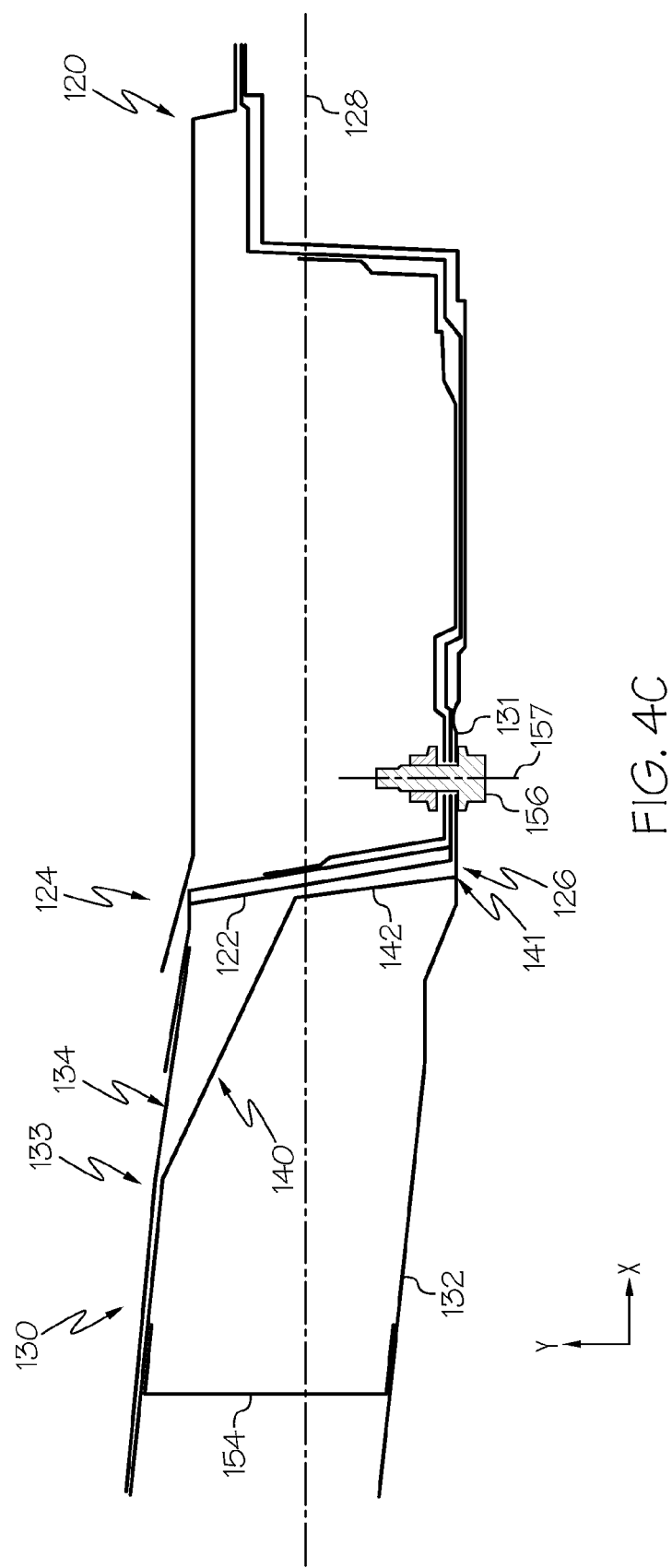
FIG. 4C schematically depicts a section view of an upper side member assembly along 4C-4C depicted in FIG. 4A according to one or more embodiments shown or described herein.

Referring to FIGS. 3, 4B, and 4C, the upper side member assembly 130 further includes an upper side member reinforcement portion 140. The upper side member reinforcement portion 140 is positioned between the upper side member outer portion 132 and the upper side member inner portion 133 evaluated in the vehicle lateral direction.

The upper side member reinforcement portion 140 includes a second engagement surface 142 that is oriented rearward in the vehicle longitudinal direction. The second engagement surface 142 may have a generally planar configuration. In other embodiments (not shown), the second engagement surface 142 may have a contoured surface. The second engagement surface 142 may be generally shaped to correspond to the configuration of the first engagement surface 122 of the A-pillar support 120.

Referring to FIG. 4C, the second engagement surface 142 is positioned to face the first engagement surface 122 of the A-pillar support 120. The second engagement surface 142 extends across at least a portion of the first engagement surface 122 of the A-pillar support 120. In the depicted embodiment, the second engagement surface 142 extends from at least from the outboard end 126 of the A-pillar support 120 to the A-pillar support centerline 128. In some embodiments, the second engagement surface 142 of the upper side member assembly 130 extends from a position proximate to the outboard end 126 of the A-pillar support 120. The second engagement surface 142 may terminate at a position spaced apart from an inboard end 124 of the A-pillar support 120. As depicted herein, the second engagement surface 142 may terminate at a position that is spaced further apart from the inboard end 124 of the A-pillar support 120 than the A-pillar support centerline 128.

In some embodiments, under ordinary vehicle operating conditions, the second engagement surface 142 of the upper side member assembly 130 is detached from the first engagement surface 122 of the A-pillar support 120. Upon introduction of energy to the upper side member assembly 130, for example, from a small front bumper overlap impact, the second engagement surface 142 may be translated rearward towards the first engagement surface 122. The first engagement surface 122 and the second engagement surface 142 may contact and engage one another such that energy of the impact can be transferred across the first engagement surface 122 and the second engagement surface 142. In other embodiments, the second engagement surface 142 may contact and engage the first engagement surface 122 under ordinary vehicle operating conditions.

By positioning the second engagement surface 142 of the upper side member reinforcement portion 140 to contact at least a portion of the first engagement surface 122 of the A-pillar support 120, force introduced to the upper side member reinforcement portion 140 may be directed and transferred into the A-pillar support 120. Through the transfer of force from the upper side member reinforcement portion 140 to the A-pillar support 120, deformation forces associated with an impact may be prevented from rotating the upper side member assembly 130 in an inboard and/or an outboard direction relative to the A-pillar support 120 during an impact, as will be described in greater detail herein. Additionally, through the transfer of force from the upper side member reinforcement portion 140 to the A-pillar support 120, deformation forces associated with an impact may be prevented from rotating the upper side member assembly 130 upward or downward in the vehicle vertical direction relative to the A-pillar support 120, as will be described in greater detail herein.

Referring to FIGS. 3 and 4C, the upper side member reinforcement portion 140 is coupled to the upper side member outer portion 132 and/or the A-pillar support 120. In some embodiments, the upper side member reinforcement portion 140 is coupled to the upper side member outer portion 132 in a subassembly. The upper side member reinforcement portion 140 may include a rearward flange 143 that extends rearward from an outboard end 141 of the second engagement surface 142. The rearward flange 143 of the upper side member reinforcement portion 140 may be coupled to the upper side member outer portion 132. The rearward flange 143 of the upper side member reinforcement portion 140 and the A-pillar support attachment flange 131 of the upper side member outer portion 132 may be coupled to the A-pillar support 120. As described hereinabove, the A-pillar support attachment flange 131 of the upper side member outer portion 132 may be coupled to the outboard end 126 of the A-pillar support 120 by one or more mechanical fasteners 156. The rearward flange 143 may be positioned and/or sandwiched between the A-pillar support attachment flange 131 of the upper side member outer portion 132 and the outboard end 126 of the A-pillar support 120, such that the one or more mechanical fasteners 156 simultaneously couple the rearward flange 143 of the upper side member reinforcement portion 140 to the outboard end 126 of the A-pillar support 120. Alternatively, as described hereinabove, the A-pillar support attachment flange 131 of the upper side member outer portion 132 may be coupled to the outboard end 126 of the A-pillar support 120 by a variety of attachments methods including, for example and without limitation, a welded attachment, a brazed attachment, and/or structural adhesives. In these alternative embodiments, the rearward flange 143 may similarly be positioned and/or sandwiched between the A-pillar support attachment flange 131 of the upper side member outer portion 132 and the outboard end 126 of the A-pillar support 120. Accordingly, the welded attachment, brazed attachment, and/or structural adhesives simultaneously couple the rearward flange 143 of the upper side member reinforcement portion 140 to the outboard end 126 of the A-pillar support 120.

Referring to FIGS. 3 and 4B, the upper side member reinforcement portion 140 also includes an upper flange 144 and a lower flange 146 that is positioned below the upper flange 144 in the vehicle vertical direction. In embodiments in which the upper side member reinforcement portion 140 is coupled to the upper side member outer portion 132, the upper flange 144 and the lower flange 146 may be coupled to the upper side member outer portion 132.

The upper side member reinforcement portion 140 may further include an inboard wall 148 that is positioned inboard of the upper flange 144 and the lower flange 146 in the vehicle lateral direction. In some embodiments, the inboard wall 148 may be coupled to the upper side member inner portion 133 by a welded attachment. Accordingly, the upper side member reinforcement portion 140 may be coupled to the upper side member outer portion 132 and the upper side member inner portion 133, thereby forming a partially-enclosed subassembly. Alternatively, or in addition to a welded attachment, the upper side member reinforcement portion 140, the upper side member inner portion 133, and the upper side member outer portion 132 may be coupled to one another through a variety of attachments methods including, for example and without limitation, a brazed attachment, mechanical fasteners, and/or structural adhesives.

Referring to FIGS. 3 and 4C, the upper side member reinforcement portion 140 may further include an upper wall 150 that extends between the inboard wall 148 and the upper flange 144 in the vehicle lateral direction. The upper side member reinforcement portion 140 may also include a lower wall 152 that extends between the inboard wall 148 and the lower flange 146 in the vehicle lateral direction. The lower wall 152 may be positioned below the upper wall 150 in the vehicle vertical direction. The upper wall 150, the inboard wall 148, and the lower wall 152 may form a hat-shaped cross section with an opening 149 that faces the upper side member outer portion 132, as depicted in FIG. 4B. By forming a hat-shaped cross section, the upper wall 150, the inboard wall 148, and the lower wall 152 may increase a section modulus of the upper side member assembly 130 as compared to an upper side member assembly 130 that does not include an upper side member reinforcement portion 140. By increasing the section modulus of the upper side member assembly 130, the upper side member reinforcement portion 140 may increase a buckling resistance of the upper side member assembly 130, as will be described in greater detail herein.

Referring again to FIG. 3, the upper side member reinforcement portion 140 may have a height 304 that is evaluated between the upper wall 150 and the lower wall 152 in the vehicle vertical direction at a rearward position 160 of the upper side member reinforcement portion 140. As depicted in FIG. 3, the rearward position 160 of the upper side member reinforcement portion 140 may be positioned proximate to the A-pillar support 120. The upper side member reinforcement portion 140 may also have a height 302 that is evaluated between the upper wall 150 and the lower wall 152 at a forward position 158. The forward position 158 of the upper side member reinforcement portion 140 is positioned forward of the rearward position 160 in the vehicle longitudinal direction when the upper side member reinforcement portion 140 is installed in the vehicle.

As depicted in the embodiment of FIG. 3, the height 304 at the rearward position 160 of the upper side member reinforcement portion 140 may be greater than the height 302 at the forward position 158 of the upper side member reinforcement portion 140. Because the height 304 at the rearward position 160 may be greater than the height 302 at the forward position 158, the upper side member reinforcement portion 140 may have a rearward-oriented flared shape. By having a rearward-oriented flared shape, the upper side member reinforcement portion 140 may have a relatively large height at the second engagement surface 142 that engages the A-pillar support 120, while having a relatively narrow height at the forward position 158. Therefore, the upper side member assembly 130 includes a large area across which force can be transferred to the A-pillar support 120 (proximate to the rearward position 160) and a narrow portion that allows for clearance of the wheel of the front suspension unit (proximate to the forward position 158).

Referring to FIGS. 3 and 4C, the upper side member assembly 130 may include a bulkhead portion 154. The bulkhead portion 154 is positioned between and coupled to the upper side member reinforcement portion 140 and the upper side member outer portion 132. In the depicted embodiments, at least a portion of the bulkhead portion 154 contacts the upper wall 150, the lower wall 152, and the inboard wall 148 of the upper side member reinforcement portion 140. The bulkhead portion 154 may be coupled to the upper wall 150, the lower wall 152, and/or the inboard wall 148 of the upper side member reinforcement portion 140. The bulkhead portion 154 may be coupled to the upper wall 150, the lower wall 152, and/or the inboard wall 148 by a variety of attachments methods including, for example and without limitation, a welded attachment, a brazed attachment, mechanical fasteners, and/or structural adhesives.

The bulkhead portion 154 may extend in the vehicle lateral direction and the vehicle longitudinal direction such that the bulkhead portion 154 is transverse to the upper wall 150, the lower wall 152, and the inboard wall 148 of the upper side member reinforcement portion 140. Because the bulkhead portion 154 is transverse to the upper wall 150, the lower wall 152, and the inboard wall 148 of the upper side member reinforcement portion 140, the bulkhead portion 154 may increase the stiffness and/or strength of the upper side member reinforcement portion 140. The bulkhead portion 154 may resist deflection of the upper wall 150 and/or the lower wall 152 of the upper side member reinforcement portion 140 in at least the vehicle vertical direction during an impact, as will be described in greater detail herein.

Figure 5:
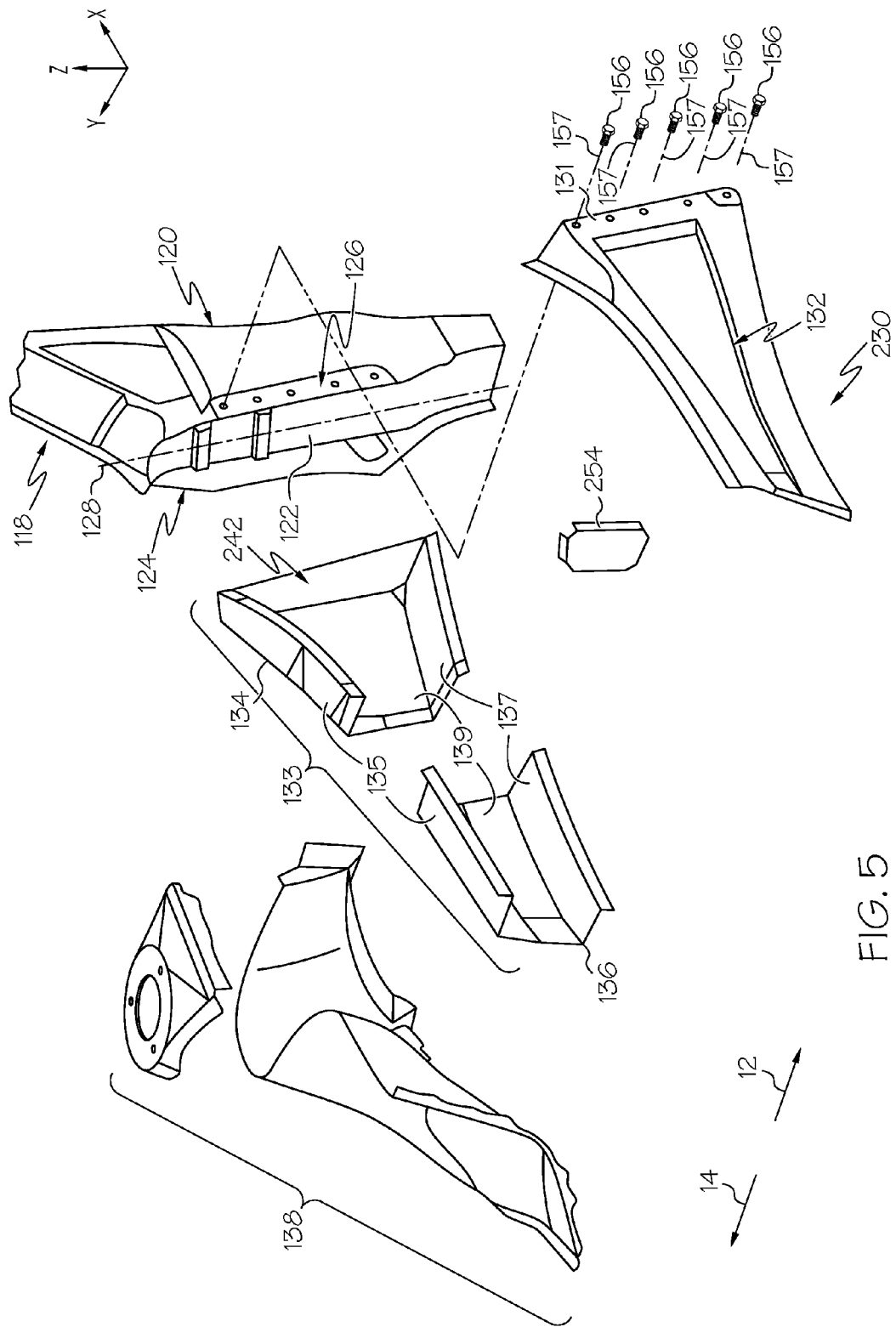
FIG. 5 schematically depicts a perspective vice of an A-pillar support and an exploded view of another embodiment of an upper side member assembly according to one or more embodiments shown or described herein.

Referring to FIG. 5, another embodiment of an upper side member assembly 230 is depicted. Similar to the embodiment described above and depicted in FIGS. 3-4C, the upper side member assembly 230 includes an upper side member outer portion 132 and an upper side member inner portion 133. However, in this embodiment, at least one of the upper side member outer portion 132 and the upper side member inner portion 133 include a second engagement surface 242.

The second engagement surface 242 is oriented to face rearward in the vehicle longitudinal direction. The second engagement surface 242 may have a generally planar configuration. In other embodiments (not shown), the second engagement surface 242 may have a contoured surface. The second engagement surface 242 may be generally shaped to correspond to the configuration of the first engagement surface 122 of the A-pillar support 120.

The second engagement surface 242 is positioned to face the first engagement surface 122 of the A-pillar support 120. The second engagement surface 242 extends across at least a portion of the first engagement surface 122 of the A-pillar support 120. In the depicted embodiment, the second engagement surface 242 extends from at least from the outboard end 126 of the A-pillar support 120 to the A-pillar support centerline 128. In some embodiments, the second engagement surface 242 of the upper side member assembly 130 extends from a position proximate to the outboard end 126 of the A-pillar support 120. The second engagement surface 242 may terminate at a position spaced apart from an inboard end 124 of the A-pillar support 120. As depicted herein, the second engagement surface 242 may terminate at a position that is spaced further apart from the inboard end 124 of the A-pillar support 120 than the A-pillar support centerline 128.

In some embodiments, under ordinary vehicle operating conditions, the second engagement surface 242 of the upper side member assembly 230 is detached from the first engagement surface 122 of the A-pillar support 120. Upon introduction of energy to the upper side member assembly 230, for example, from a small front bumper overlap impact, the second engagement surface 242 may be translated rearward towards the first engagement surface 122. The first engagement surface 122 and the second engagement surface 242 may contact and engage one another such that energy of the impact can be transferred across the first engagement surface 122 and the second engagement surface 242. In other embodiments, the second engagement surface 242 may contact and engage the first engagement surface 122 under ordinary vehicle operating conditions.

By positioning the second engagement surface 242 of the upper side member assembly 230 to contact at least a portion of the first engagement surface 122 of the A-pillar support 120, force introduced to the upper side member assembly 230 may be directed and transferred into the A-pillar support 120. Through the transfer of force from the upper side member assembly 230 to the A-pillar support 120, deformation forces associated with an impact may be prevented from rotating the upper side member assembly 230 in an inboard and/or an outboard direction relative to the A-pillar support 120 during an impact, as will be described in greater detail herein. Additionally, through the transfer of force from the upper side member assembly 230 to the A-pillar support 120, deformation forces associated with an impact may be prevented from rotating the upper side member assembly 230 upward or downward in the vehicle vertical direction relative to the A-pillar support 120, as will be described in greater detail herein.

As described above with respect to FIG. 3, in this embodiment of the upper side member assembly 230, the upper side member outer portion 132 of the upper side member assembly 230 is coupled to the A-pillar support 120. The upper side member outer portion 132 may include an A-pillar support attachment flange 131 that may be coupled to the outboard end 126 of the A-pillar support 120. Through the joining of the A-pillar support attachment flange 131 to the outboard end 126 of the A-pillar support 120, the upper side member assembly 230 is coupled to the A-pillar support 120. The upper side member outer portion 132 may be coupled to the A-pillar support 120 by one or more mechanical fasteners 156. The one or more mechanical fasteners 156 may include a variety of mechanical fasteners, for example and without limitation, bolts, nut and bolt assemblies, sheet metal screws, and rivets, or the like. Each of the plurality of mechanical fasteners 156 may include a centerline axis 157 that extends through the centerline of the mechanical fasteners 156. The centerline axis 157 of each of the mechanical fasteners 156 may be positioned to be transverse to the A-pillar support attachment flange 131. Alternatively or in addition to the mechanical fasteners 156, the upper side member outer portion 132 may be coupled to the A-pillar support 120 by a variety of attachments methods including, for example and without limitation, a welded attachment, a brazed attachment, and/or structural adhesives.

As described above with respect to FIGS. 3 and 4C, in this embodiment, the upper side member assembly 230 may include a bulkhead portion 254. The bulkhead portion 254 is positioned between and coupled to the upper side member inner portion 133 and the upper side member outer portion 132. In the depicted embodiments, at least a portion of the bulkhead portion 254 contacts the upper wall 135, the lower wall 137, and the inboard wall 139 of the upper side member inner portion. The bulkhead portion 254 may be coupled to the upper wall 135, the lower wall 137, and/or the inboard wall 139 of the upper side member inner portion 133. The bulkhead portion 254 may be coupled to the upper wall 135, the lower wall 137, and/or the inboard wall 139 by a variety of attachments methods including, for example and without limitation, a welded attachment, a brazed attachment, mechanical fasteners, and/or structural adhesives.

The bulkhead portion 254 may extend in the vehicle lateral direction and the vehicle longitudinal direction such that the bulkhead portion 254 is transverse to the upper wall 135, the lower wall 137, and the inboard wall 139 of the upper side member inner portion 133. Because the bulkhead portion 254 is transverse to the upper wall 135, the lower wall 137 of the upper side member inner portion 133, the bulkhead portion 254 may increase the stiffness and/or strength of the upper side member inner portion 133. The bulkhead portion 254 may resist deflection of the upper wall 135 and/or the lower wall 137 of the upper side member inner portion 133 in at least the vehicle vertical direction during an impact, as will be described in greater detail herein.

When a vehicle is involved in an impact, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

The front corner of the vehicle may strike by an object in what is referred to herein as a small front bumper overlap or a small overlap impact. In a small front bumper overlap impact, the impact occurs at an outboard portion of the vehicle (evaluated in a vehicle lateral direction), and only a portion of the front bumper strikes the object. In some small front bumper overlap impacts, only about 25% of the front bumper strikes the object. In such impacts, some of the energy dissipation elements of the vehicle may not be initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the unibody for example, may be non-symmetrically loaded when the vehicle is involved in a small overlap impacts.

Referring in general to FIG. 1, when a vehicle strikes an object with a front corner of the vehicle, the structures of the vehicle plastically and elastically deform to absorb the energy of the impact. Because only a portion of the front bumper strikes an object during a small front bumper overlap impact, all of the energy absorbing structures associated with the front bumper (including vehicle structures that are positioned along an opposite side of the vehicle form the location of the impact) may have a reduced effect on the dissipation of energy of the impact. In particular, some of the energy absorbing structures associated with the front bumper of the vehicle may not be activated or may be only partially activated, such that a portion of the energy absorbing structure of the vehicle may not dissipate energy associated with the small front bumper overlap impact. Instead, the energy from the impact may be directed into the upper side member assembly of the vehicle that is proximate to the barrier that the vehicle impacts. The energy associated with the impact, therefore, is directed rearward towards the passenger cabin of the vehicle.

Referring to FIG. 1, the energy of the small front bumper overlap impact is directed into the portion of the front bumper that is proximate to the barrier and to the upper side member assembly 130 that is proximate to the barrier that the vehicle 100 impacts. The upper side member assembly 130 may also deflect inboard and away from the location of the impact. When the upper side member assembly 130 deflects inboard and away from the impact, the upper side member assembly 130 may absorb less energy from the impact than when the upper side member assembly 130 remains in its original orientation in which the upper side member assembly 130 generally extends in the vehicle longitudinal direction. The upper side member assembly 130 may also deflect upward or downward and away from the location of the impact. When the upper side member assembly 130 deflects upward or downward and away from the impact, the upper side member assembly 130 may absorb less energy from the impact than when the upper side member assembly 130 remains in its original orientation in which the upper side member assembly 130 generally extends in the vehicle longitudinal direction.

Referring again to FIGS. 4C and 5, as discussed hereinabove, the second engagement surface 142, 242 of the upper side member reinforcement portion 140 and/or the upper side member assembly 230 is engaged with the first engagement surface 122 of the A-pillar support 120. Because the second engagement surface 142, 242 is engaged with the first engagement surface 122 and/or the upper side member reinforcement portion 140 is coupled to the A-pillar support 120, energy introduced to the exemplary upper side member assemblies 130, 230 may be directed into the A-pillar support 120. Further, because the first engagement surface 122 and the second engagement surface 142, 242 engage one another over a width evaluated in the vehicle lateral direction and a height evaluated in the vehicle vertical direction, any force that tends to apply a torque between the upper side member assembly 130, 230 and the A-pillar support 120 may be minimized. Instead, this energy is transferred through the engagement of the first engagement surface 122 and the second engagement surface 142, 242. The upper side member assembly 130, 230, therefore, may resist inboard and/or upward and downward deflection during an impact.

Further, as described hereinabove, the upper side member outer portion 132 includes an A-pillar support attachment flange 131 that is coupled to the A-pillar support 120. As also described hereinabove, the upper side member reinforcement portion 140 includes a rearward flange 143 that may be positioned between and/or sandwiched between the A-pillar support attachment flange 131 and the A-pillar support 120. The A-pillar support attachment flange 131 and the rearward flange 143 may be coupled to the A-pillar support 120 by one or more mechanical fasteners 156. The one or more mechanical fasteners 156 may resist energy directed into the upper side member reinforcement portion 140 and the upper side member outer portion 132 in the vehicle longitudinal direction (i.e., shear force applied to the mechanical fasteners 156). The one or more mechanical fasteners 156 may also resist inboard deflection of the upper side member reinforcement portion 140 and upper side member outer portion 132 in the vehicle lateral direction (i.e., tensile force applied to the mechanical fasteners 156), thereby resisting inboard deflection of the upper side member assembly 130, 230.

Because the upper side member reinforcement portion 140 may resist inboard deflection of the upper side member assembly 130, the upper side member reinforcement portion 140 may assist in maintaining the upper side member assembly 130 proximate to its original longitudinal orientation. Likewise, because the second engagement surface 242 may resist inboard deflection of the upper side member assembly 230, the upper side member assembly 230 may be maintained proximate to its original longitudinal orientation. By maintaining the upper side member assembly 130, 230 proximate its original longitudinal orientation, the upper side member assembly 130, 230 may absorb more energy from the impact than when the upper side member assembly 130, 230 deflects inboard and away from the impact. Further, when the upper side member assembly 130, 230 is maintained proximate to its original longitudinal orientation, the upper side member assembly 130, 230 may transfer more energy to the A-pillar support 120 than when the upper side member assembly 130, 230 deflects inboard and away from the impact. Accordingly, by maintaining the upper side member assembly 130, 230 proximate to its original longitudinal orientation, the upper side member reinforcement portion 140 and/or the second engagement surface 242 assists in directing energy from the impact from upper side member assembly 130, 230 to the A-pillar support 120, which may subsequently be directed around the cabin 108.

Further, as described hereinabove, in some embodiments, the second engagement surface 142, 242 extends between at least the outboard end 126 of the A-pillar support 120 and the A-pillar support centerline 128. Accordingly, the second engagement surface 142, 242 may have an increased contact area with the A-pillar support 120 than in vehicles 100 that do not include a second engagement surface 142, 242 that extends between at least the outboard end 126 of the A-pillar support 120 and the A-pillar support centerline 128. Because the second engagement surface 142, 242 has an increased contact area with the A-pillar support, the upper side member reinforcement portion 140 and/or the upper side member assembly 130. 230 may distribute energy from the impact across a larger area of the A-pillar support 120. By distributing the energy from the impact across a larger area, the upper side member reinforcement portion 140 and/or the upper side member assembly 130, 230 may distribute energy of the impact across a wide area of the A-pillar support 120, thereby reducing introduction of energy at discrete points along the A-pillar support 120, which may reduce intrusion of the A-pillar support 120 into the cabin 108.

Further, as described hereinabove, the upper side member reinforcement portion 140 may include an inboard wall 148, an upper wall 150, and a lower wall 152 that form a hat-shaped cross section. As described hereinabove, the hat-shaped cross section may increase a section modulus of the upper side member assembly 130 as compared to an upper side member assembly 130 that does not include an upper side member reinforcement portion 140. By increasing the section modulus of the upper side member assembly 130, the upper side member reinforcement portion 140 may increase a buckling resistance of the upper side member assembly 130 as compared to an upper side member assembly 130 that does not include an upper side member reinforcement portion 140.

By increasing the buckling resistance of the upper side member assembly 130, the upper side member reinforcement portion 140 may increase the energy absorption capacity of the upper side member assembly 130, which represents the amount of energy that may be absorbed through elastic and plastic deformation of the upper side member assembly 130 during an impact. By increasing the energy absorption capacity of the upper side member assembly 130, the upper side member reinforcement portion 140 may decrease the amount of energy from an impact that is transmitted from the upper side member assembly 130 to the A-pillar support 120 and/or the cabin 108 of the vehicle 100.

During an impact, for example, during a small front bumper overlap impact, the upper side member assembly 130, 230 may also deflect away from the location of the impact. When the upper side member assembly 130, 230 deflects away from the location of the impact, the upper side member assembly 130, 230 may absorb less energy from the impact than when the upper side member assembly 130, 230 remains proximate to its original orientation. As described hereinabove, the upper side member assembly 130, 230 may include a bulkhead portion 154, 254. In embodiments including the upper side member reinforcement portion 140, the bulkhead portion 154 may be coupled to the upper wall 150 and the lower wall 152 of the upper side member reinforcement portion 140. Because the bulkhead portion 154 is coupled to the upper wall 150 and the lower wall 152 of the upper side member reinforcement portion 140, the bulkhead portion 154, 254 may stabilize the upper wall 150 and the lower wall 152. Further, because the bulkhead portion 154 extends in a direction transverse to the upper wall 150 and the lower wall 152, the bulkhead portion 154 may resist deflection of the upper wall 150 and/or the lower wall 152 in the vehicle vertical direction. By resisting deflection of the upper wall 150 and/or the lower wall 152 in the vehicle vertical direction, the bulkhead portion 154 may assist in maintaining the upper side member reinforcement portion 140, and therefore, the upper side member assembly 130, proximate to its original orientation. By maintaining the upper side member assembly 130 in a position proximate to its original orientation, the upper side member assembly 130 may absorb more energy from the impact than when the upper side member assembly 130 deflects away from the location of the impact.

In embodiments that do not include an upper side member reinforcement portion 140, the bulkhead portion 254 may be coupled to the upper wall 135 and the lower wall 137 of the upper side member inner portion 133. Because the bulkhead portion 254 is coupled to the upper wall 135 and the lower wall 137 of the upper side member inner portion 133, the bulkhead portion 254 may stabilize the upper wall 135 and the lower wall 137. Further, because the bulkhead portion 254 extends in a direction transverse to the upper wall 135 and the lower wall 137, the bulkhead portion 254 may resist deflection of the upper wall 135 and/or the lower wall 137 in the vehicle vertical direction. By resisting deflection of the upper wall 135 and/or the lower wall 137 in the vehicle vertical direction, the bulkhead portion 254 may as sist in maintaining the upper side member inner portion 133, and therefore, the upper side member assembly 230, proximate to its original orientation. By maintaining the upper side member assembly 230 in a position proximate to its original orientation, the upper side member assembly 230 may absorb more energy from the impact than when the upper side member assembly 230 deflects away from the location of the impact.

Further, the upper side member assembly 130, 230 may dissipate an amount of energy that corresponds to the energy absorption capacity of the upper side member assembly 130, 230 when the upper side member assembly 130 is maintained proximate to its original orientation. Additionally the upper side member assembly 130, 230 may direct more energy to the A-pillar support 120 than when the upper side member assembly 130, 230 deflects away from the location of the impact. Accordingly, by maintaining the upper side member assembly 130, 230 in a position proximate to its original orientation, the bulkhead portion 154, 254 assists in distributing energy from the impact from upper side member assembly 130, 230 to the A-pillar support 120, which may subsequently be directed around the cabin 108.

It should now be understood that vehicles according to the present disclosure may include an upper side member reinforcement portion. The upper side member reinforcement portion may maintain the upper side member assemblies of the vehicle close to the vehicle longitudinal direction, thereby maintaining the energy absorption capacity of the upper side member assemblies so that energy associated with the impact may be dissipated. According to various embodiments, the upper side member reinforcement portions may include additional elements that allow the upper side member reinforcement portions to maintain the upper side member assemblies close to the vehicle longitudinal direction and increase a buckling resistance of the upper side member assemblies.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   an A-pillar support comprising a first engagement surface that is oriented forward in a vehicle longitudinal direction, the first engagement surface extending across at least a portion of the A-pillar support in a vehicle lateral direction that is transverse to the vehicle longitudinal direction; and
   an upper side member assembly coupled to and extending forward from the A-pillar support, the upper side member assembly comprising:
      an upper side member outer portion;
      an upper side member inner portion coupled to the upper side member outer portion and positioned inboard of the upper side member outer portion in the vehicle lateral direction; and
      an upper side member reinforcement portion positioned between the upper side member outer portion and the upper side member inner portion and coupled to at least one of the upper side member outer portion or the upper side member inner portion, the upper side member reinforcement portion comprising a second engagement surface that is oriented to face rearward in the vehicle longitudinal direction and to face the first engagement surface of the A-pillar support.

2. The vehicle of claim 1, further comprising an A-pillar support attachment flange that is coupled to the upper side member assembly and to the A-pillar support, the A-pillar support attachment flange extending in a direction that is transverse to the first engagement surface and the second engagement surface.

3. The vehicle of claim 2, wherein the upper side member assembly further comprises a rearward flange that extends rearward from an outboard end of the second engagement surface and that is coupled to the A-pillar support and to the A-pillar support attachment flange, the rearward flange extending in a direction that is transverse to the first engagement surface and the second engagement surface.

4. The vehicle of claim 3, wherein the rearward flange is sandwiched between the A-pillar support attachment flange and the A-pillar support in the vehicle lateral direction.

5. The vehicle of claim 2, further comprising a plurality of mechanical fasteners that couple the upper side member assembly to the A-pillar support through the A-pillar support attachment flange, wherein each of the plurality of mechanical fasteners comprise a centerline axis, and the centerline axes of the plurality of mechanical fasteners are oriented transverse to the A-pillar support attachment flange.

6. The vehicle of claim 2, wherein the upper side member assembly is coupled to the A-pillar support through a welded attachment between the A-pillar support and the A-pillar support attachment flange.

7. The vehicle of claim 1, wherein the upper side member reinforcement portion further comprises an inboard wall that is positioned inboard of the upper side member outer portion in the vehicle lateral direction.

8. The vehicle of claim 7, wherein the upper side member reinforcement portion further comprises an upper wall that extends between the inboard wall and the upper side member outer portion and a lower wall that extends between the inboard wall and the upper side member outer portion.

9. The vehicle of claim 8, wherein the upper side member reinforcement portion has a height that is evaluated between the upper wall and the lower wall that is greater at a rearward position of the upper side member reinforcement portion than the height of the upper side member reinforcement portion at a forward position of the upper side member reinforcement portion that is positioned forward of the rearward position in the vehicle longitudinal direction.

10. The vehicle of claim 8, wherein the upper side member assembly further comprises a bulkhead portion that is coupled to and positioned between the upper side member reinforcement portion and the upper side member outer portion.

11. The vehicle of claim 10, wherein the bulkhead portion extends transverse to the upper wall, the lower wall, and the inboard wall of the upper side member reinforcement portion and the bulkhead portion is coupled to the upper wall, the lower wall, and the inboard wall of the upper side member reinforcement portion.

12. The vehicle of claim 1, wherein the second engagement surface of the upper side member assembly extends from a position proximate to an outboard end of the A-pillar support and terminates at a position spaced apart from an inboard end of the A-pillar support.

13. The vehicle of claim 1, wherein the upper side member inner portion comprises an upper wall, a lower wall that is positioned below the upper wall in a vehicle vertical direction, and an inboard wall that extends between the upper wall and the lower wall, and the vehicle further comprises a bulkhead portion that is coupled to and positioned between the upper wall and the lower wall.

14. A vehicle comprising:
    an A-pillar support extending upward in a vehicle vertical direction, the A-pillar support comprising:
       a first engagement surface that is oriented forward in a vehicle longitudinal direction, the first engagement surface extending across at least a portion of the A-pillar support in a vehicle lateral direction that is transverse to the vehicle longitudinal direction;
       an inboard end;
       an outboard end that is positioned outboard of the inboard end in the vehicle lateral direction; and an A-pillar support centerline that bisects the A-pillar support between the inboard end and the outboard end; and an upper side member assembly coupled to and extending forward from the A-pillar support in the vehicle longitudinal direction, the upper side member assembly comprising:

an upper side member outer portion;

an upper side member inner portion coupled to and positioned inboard of the upper side member outer portion in the vehicle lateral direction; and a second engagement surface that is oriented to face rearward in the vehicle longitudinal direction and to face the first engagement surface of the A-pillar support, and wherein the second engagement surface extends at least between the outboard end and the A-pillar support centerline in the vehicle lateral direction, wherein the second engagement surface extends from a position proximate to the outboard end of the A-pillar support and terminates at a position spaced apart from the inboard end of the A-pillar support.

15. The vehicle of claim 14, wherein the upper side member assembly further comprises an upper side member reinforcement portion positioned between the upper side member outer portion and the upper side member inner portion and coupled to at least one of the upper side member outer portion or the upper side member inner portion, wherein the upper side member reinforcement portion comprises the second engagement surface.

16. The vehicle of claim 15, wherein the upper side member reinforcement portion further comprises an inboard wall that is positioned inboard of the upper side member outer portion in the vehicle lateral direction.

17. The vehicle of claim 16, wherein the upper side member reinforcement portion further comprises an upper wall that extends between the inboard wall and the upper side member outer portion and a lower wall that extends between the inboard wall and the upper side member outer portion.

18. The vehicle of claim 17, wherein the upper side member assembly further comprises a bulkhead portion that is coupled to and positioned between the upper side member reinforcement portion and the upper side member outer portion.

* * * * *